(12) United States Patent
Marupaduga et al.

(10) Patent No.: US 11,012,142 B1
(45) Date of Patent: *May 18, 2021

(54) RELAY NODE ASSIGNMENT IN OVERLAPPED COVERAGE AREAS

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,781

(22) Filed: Apr. 3, 2019

(51) Int. Cl.
*H04B 7/155* (2006.01)
*H04B 7/0452* (2017.01)
*H04W 84/04* (2009.01)

(52) U.S. Cl.
CPC ....... *H04B 7/15507* (2013.01); *H04B 7/0452* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 9,060,290 B2 | 6/2015 | Halbauer et al. | |
| 9,768,983 B2 | 9/2017 | Marzetta et al. | |
| 9,906,338 B1 * | 2/2018 | Pawar | H04W 16/16 |
| 10,595,256 B1 * | 3/2020 | Marupaduga | H04W 36/08 |
| 2006/0084445 A1 * | 4/2006 | Minami | H04W 28/08 455/452.1 |
| 2006/0291417 A1 * | 12/2006 | Aust | H05K 13/0413 370/331 |
| 2010/0203916 A1 * | 8/2010 | Tiwari | H04B 7/0689 455/513 |
| 2012/0276946 A1 * | 11/2012 | Sung | H04W 36/32 455/525 |
| 2013/0084864 A1 * | 4/2013 | Agrawal | H04W 36/00837 455/436 |
| 2015/0016379 A1 * | 1/2015 | Nam | H04B 7/0619 370/329 |
| 2015/0078162 A1 | 3/2015 | Prakash et al. | |
| 2015/0162961 A1 * | 6/2015 | Jalloul | H04B 7/0689 370/330 |
| 2016/0156520 A1 * | 6/2016 | Scully | H04L 41/0893 370/254 |
| 2019/0296881 A1 * | 9/2019 | Ang | H04L 1/1819 |
| 2020/0304938 A1 * | 9/2020 | Marupaduga | H04B 7/0452 |

* cited by examiner

*Primary Examiner* — Christopher T Wyllie (57) ABSTRACT

A wireless network may have two types of wireless services such as 4G and 5G. The 4G service may not be configured to communicate with wireless devices using multi-user multiple-input multiple-output (MU-MIMO) operating mode, while the 5G service can communicate using MU-MIMO. When a relay node is positioned such that it is within the coverage areas of both types of wireless service, the relay node is instructed to attach to the wireless service that is not capable of utilizing the MU-MIMO operating mode. Conversely, wireless devices within the coverage areas of both types of wireless service that are not configured as relay nodes may be instructed to attach to the wireless service capable of utilizing the MU-MIMO operating mode so that these wireless devices may receive the benefit of utilizing MU-MIMO.

20 Claims, 8 Drawing Sheets

RELAY NODE ASSIGNMENT IN OVERLAPPED COVERAGE AREAS

TECHNICAL BACKGROUND

Wireless networks incorporating access nodes, relay nodes, and other small-cell access nodes are becoming increasingly common. These may be referred to as heterogeneous networks. Relay nodes improve service quality by relaying communication between an access node, and end-user wireless devices in the wireless network. For example, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto.

Wireless networks may also be configured to utilize a single-user multiple-in multiple-out (SU-MIMO) operating mode and/or a multi-user (MU-MIMO) mode. In the SU-MIMO operating mode, multiple data streams are directed towards individual wireless devices and/or relay nodes. In the MU-MIMO operating mode, the multiple data streams can be directed towards wireless devices and/or relay nodes that are selected to participate in the MU-MIMO operating mode based on the orthogonality of transmission.

This helps maximize resources.

OVERVIEW

Exemplary embodiments described herein include a method of operating a communication system, includes receiving an indicator that a first wireless device is within a first coverage area for a first type of wireless service and is also within a second coverage area for a second type of wireless service. The second type of wireless service is configured to utilize a multi-user multiple-input multiple-output (MU-MIMO) operating mode. The method further includes identifying the first wireless device as being configured as a relay node that is configured to attach to a first radio air interface and to deploy a second radio air interface to which one or more end-user wireless devices become attached. The method further includes, based on the first wireless device being configured as a relay node, instructing the first wireless to attach the first radio air interface to the first type of wireless service.

An exemplary system for allocating resources in a wireless network includes a processing node and a processor coupled to the processing node. The processor is configured to perform operations that include receiving a first indicator that a first wireless device that is configured as a relay node is within a first coverage area for a first type of wireless service. The operations also include receiving a second indicator that the first wireless device is also within a second coverage area for a second type of wireless service. The second type of wireless service is configured to utilize a multi-user multiple-input multiple-output (MU-MIMO) operating mode. The operations also include receiving a third indicator that a second wireless device is within the first coverage area for a first type of wireless service and receiving a fourth indicator that the second wireless device is also within the second coverage area for a second type of wireless service. The operations also include identifying the second wireless device as an end-user wireless device. The operations also include, based on the second wireless device being an end-user wireless device, instructing the second wireless to attach to the second type of wireless service.

An exemplary processing node for scheduling resources in a wireless network is configured to provide a first type of wireless service and to provide a second type of wireless service. The processing node is configured to perform operations that include determining a first wireless device is within a first coverage area of the first type of wireless service where the first type of wireless service is not utilizing a multi-user multiple-input multiple-output (MU-MIMO) operating mode. The operations also include determining the first wireless device is within a second coverage area of the second type of wireless service where the second type of wireless service configured to utilize the MU-MIMO operating mode. The operations also include identifying the first wireless device as being a relay node configured to attach to a first radio air interface and to deploy a second radio air interface to which one or more end-user wireless devices become attached. The operations also include, based on the identification of the first wireless device as being a relay node, instructing the first wireless device to attach to the first type of wireless service.

DETAILED DESCRIPTION

In embodiments disclosed herein, a wireless network may have two types of wireless service. The first of these wireless services (e.g., 4G with 8 transmit and 8 receive antennas—8T8R) may not be configured to communicate with wireless devices using multi-user multiple-input multiple-output (MU-MIMO) operating mode. The second of these wireless services (e.g., 5G with 64+ transmit and 64+ receive antennas—a.k.a., massive MIMO or mMIMO) is capable of utilizing the MU-MIMO operating mode. Both services of the wireless network are also capable of using wireless devices that are configured as relay nodes. When a relay node is positioned such that it may attach to both types of wireless service (i.e., it is within the coverage area of both types of wireless service), the relay node is instructed to attach to the wireless service that is not capable of utilizing the MU-MIMO operating mode. Conversely, wireless devices that may attach to both types of wireless service that are not configured as relay nodes may be instructed to attach to the wireless service capable of utilizing the MU-MIMO operating mode so that these wireless devices may receive the benefit of utilizing MU-MIMO.

In embodiments disclosed herein, a method of operating a communication system, includes receiving an indicator that a first wireless device may attach to a first type of wireless service and also may attach to a second type of wireless service. The second type of wireless service is configured to utilize a multi-user multiple-input multiple-output (MU-MIMO) operating mode. The method further includes identifying the first wireless device as being configured as a relay node such that it is to attach to a first radio air interface and to deploy a second radio air interface to which one or more end-user wireless devices become attached. The method further includes, based on the first wireless device being configured as a relay node, instructing the first wireless device to attach the first radio air interface to the first type of wireless service.

Alternatively or in addition, a second indicator that a second wireless device may attach to the first type of wireless service and also may attach to the second type of wireless service may be received. The second wireless device may be identified as an end-user wireless device. Based on the second wireless device being an end-user wireless device, the second wireless may be instructed to attach to the second type of wireless service. The second wireless device may be further instructed to start utilizing the MU-MIMO operating mode. The first type of wireless service may be, for example, associated with Fourth Generation (4G) wireless broadband communication service. The second type of wireless service may be, for example, associated with Fifth Generation (5G) wireless broadband communication service.

In another exemplary embodiment, a system for allocating resources in a wireless network includes a processing node and a processor coupled to the processing node. The processor is configured to perform operations that include receiving a first indicator that a first wireless device that is configured as a relay node is within a first coverage area for a first type of wireless service. The operations also include receiving a second indicator that the first wireless device is also within a second coverage area for a second type of wireless service. The second type of wireless service is configured to utilize a multi-user multiple-input multiple-output (MU-MIMO) operating mode. The operations also include receiving a third indicator that a second wireless device is within the first coverage area for a first type of wireless service and receiving a fourth indicator that the second wireless device is also within the second coverage area for a second type of wireless service. The operations also include identifying the second wireless device as an end-user wireless device. The operations also include, based on the second wireless device being an end-user wireless device, instructing the second wireless to attach to the second type of wireless service.

Alternatively or in addition, the processor is further configured to instruct the second wireless device to start utilizing the MU-MIMO operating mode. The first wireless device may be identified by the processor as a relay node that is to attach to a first radio air interface and to deploy a second radio air interface to which one or more end-user wireless devices become attached. The processor may be further configured to, based on the first wireless device being configured as a relay node, instruct the first wireless device to attach the first radio air interface to the first type of wireless service. The processor may be further configured to determine that a number of end-user wireless devices attached to the first wireless device meet a first threshold number. The processor may be further configured to, based on the number of end-user wireless devices meeting the first threshold number, increase a priority of resources allocated towards the first wireless device. The processor may be further configured to, based on the number of end-user wireless devices meeting a second threshold number, instruct the first wireless device to attach the first radio air interface to the second type of wireless service.

In another exemplary embodiment, a processing node for scheduling resources in a wireless network is configured to provide a first type of wireless service and to provide a second type of wireless service. The processing node is configured to perform operations that include determining a first wireless device is within a first coverage area of the first type of wireless service where the first type of wireless service is not utilizing a multi-user multiple-input multiple-output (MU-MIMO) operating mode. The operations also include determining the first wireless device is within a second coverage area of the second type of wireless service where the second type of wireless service is configured to utilize the MU-MIMO operating mode. The operations also include identifying the first wireless device as being a relay node configured to attach to a first radio air interface and to deploy a second radio air interface to which one or more end-user wireless devices become attached. The operations also include, based on the identification of the first wireless device as being a relay node, instructing the first wireless device to attach to the first type of wireless service.

Alternatively or in addition, the operations may further include determining a second wireless device is within the first coverage area of the first type of wireless service. The operations may include determining the second wireless device is within the second coverage area of the second type of wireless service. The operations may include identifying the second wireless device as being an end-user wireless device. The operations may include, based on the identification of the second wireless device as being an end-user wireless device, instructing the second wireless device to attach to the second type of wireless service. The operations may include instructing the second wireless device to start utilizing the MU-MIMO operating mode.

These and additional operations are further described with respect to the embodiments depicted in FIGS. 1-7.

Figure 1:
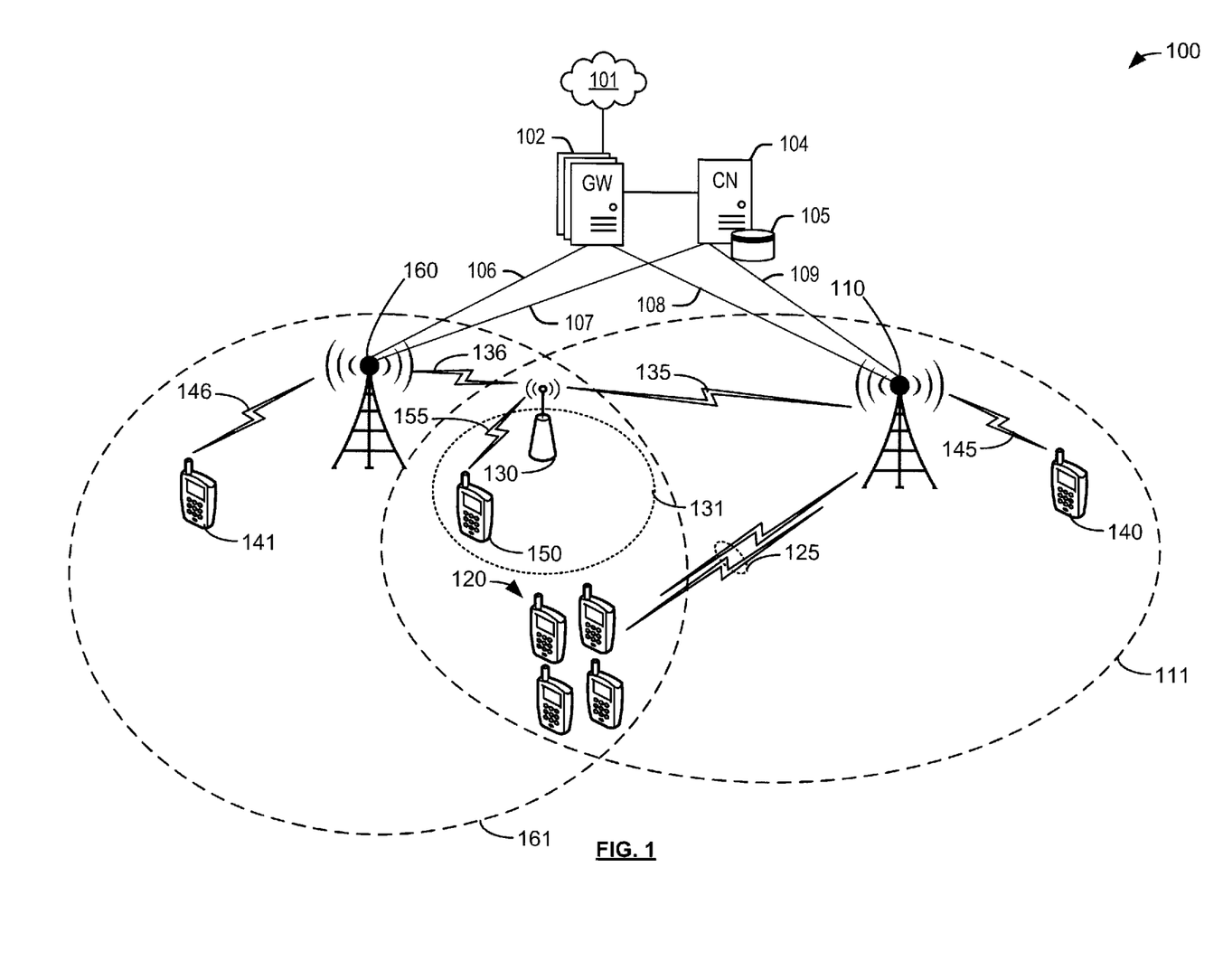
FIG. 1 is a block diagram illustrating a communication system.

FIG. 1 is a block diagram illustrating a communication system. System 100 comprises a communication network 101, gateway node(s) 102, controller node 104, access node 110, access node 160, relay node 130, wireless devices 120, 140, 141, and 150. Access node 160 is illustrated as deploying a wireless air interface coverage area 161 (a.k.a., a sector) for a first type of wireless service. Access node 110 is illustrated as deploying a wireless air interface coverage area 111 for a second type of wireless service. In an embodiment, access node 160 and access node 110 may be collocated. In this case, coverage area 111 and coverage area 161 may be substantially the same.

Relay node 130 and wireless devices 120, 140, and 150 are located within coverage area 111 and may access network services via access node 110. Relay node 130 and wireless device 141 are located within coverage area 161 and may access network services via access node 160.

Relay node 130 may be configured to communicate with access node 110 over communication link 135, (hereinafter, "wireless backhaul" or simply "backhaul"). Relay node 130 may be configured to communicate with access node 160 over communication link 136. Relay node 130 is further configured to deploy additional wireless air interfaces over coverage areas 131. Wireless device 150 is configured to attach to the wireless air interface of relay node 130. Wireless device 150 may access network services from access node 110 (via link 135) or access node 160 (via link 135) by virtue of being connected to relay node 130. Consequently, access nodes 110 and 160 may be termed a "donor" access nodes. In other embodiments, any other combination of wireless devices, donor access nodes, relay access nodes, and carriers deployed therefrom may be evident to those having ordinary skill in the art in light of this disclosure.

In operation, control node 104 (or another entity within system 100) may be configured to execute a method of operating a communication system that includes receiving an indicator that a first wireless device (e.g., relay node 130) may attach to a first type of wireless service (e.g., 4G as provided by access node 160) and also may attach to a second type of wireless service (e.g., 5G as provided by access node 110). The second type of wireless service (e.g., provided by access node 110) is configured to utilize a multi-user multiple-input multiple-output (MU-MIMO) operating mode. The method further includes identifying the first wireless device as being configured as a relay node that is to attach to a first radio air interface and to deploy a second radio air interface to which one or more end-user wireless devices (e.g., wireless device 150) become attached. The method further includes, based on the first wireless device being configured as a relay node, instructing the first wireless to attach the first radio air interface to the first type of wireless service.

Alternatively or in addition, a second indicator that a second wireless device (e.g., one or more of wireless devices 120) is within the first coverage area and is also within the second coverage area may be received. The second wireless device may be identified as an end-user wireless device. Based on the second wireless device being an end-user wireless device, the second wireless device may be instructed to attach to the second type of wireless service. The second wireless device may be further instructed to start utilizing the MU-MIMO operating mode. The first type of wireless service may be, for example, associated with Fourth Generation (4G) wireless broadband communication service. The second type of wireless service may be, for example, associated with Fifth Generation (5G) wireless broadband communication service.

In addition, it may be determined (e.g., by control node 104 or access node 160, etc.) that the number of end-user wireless devices attached to relay node 130 meets a first threshold number (e.g., 10 devices, 20 devices, etc.). Based on the number of end-user wireless devices meeting the first threshold number, a priority of resources allocated towards the first wireless device may be increased.

The resources described herein may be, for example, physical resource blocks (PRBs) within one or more subframes of a radio-air interface deployed by an access node. For example, a subframe can comprise a plurality of PRBs allocated for control information (e.g. within a control channel) and for data transmission (e.g. within a data channel).

Based on the number of end-user wireless devices meeting a second threshold number (e.g., zero attached devices), the first wireless device may be instructed to attach the first radio air interface to the second type of wireless service. Once attached to the second type of wireless service, the first wireless device may be instructed to utilize the MU-MIMO operating mode.

Access node 110 can be any network node configured to utilize MU-MIMO and to provide communication between relay node 130, wireless devices 120, 140, 141, 150 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. By virtue of comprising a plurality of antennae as further described herein, access node 110 can deploy or implement multiple-input-multiple-output (MIMO) modes, such as single user MIMO (SU-MIMO), or multi-user MIMO (MU-MIMO) modes. In an exemplary embodiment, access node 110 may utilize hundreds of antennae to simultaneously transmit each of a plurality of different data streams (such as MU-MIMO data stream 125) to a corresponding plurality of wireless devices (such as wireless devices 120).

Access node 160 can be any network node that is not configured to utilize MU-MIMO but can provide communication between relay node 130, wireless devices relay node 130, wireless devices 120, 140, 141, 150 and communication network 101, including standard access nodes and/ or short range, low power, small access nodes. For instance, access node 110 may include any standard access node, such as a macrocell access node, base transceiver station, a radio base station, an eNodeB device, an enhanced eNodeB device, or the like. Moreover, it is noted that while access node 110 and access node 160 are illustrated in FIG. 1, any number of access nodes can be implemented within system 100.

Relay node 130 may comprise any short range, low power, small-cell access nodes such as a microcell access node, a picocell access node, a femtocell access node, or a home eNodeB device. In addition, relay node 130 may comprise a small-cell access node paired with a relay wireless device configured to communicate over backhaul 135.

Access node 110, access node 160, and relay node 130 can each comprise a processor and associated circuitry to execute or direct the execution of computer-readable instructions to perform operations such as those further described herein. Briefly, access node 110, access node 160, and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110, access node 160, and relay node 130 can receive instructions and other input at a user interface. Access node 110 communicates with gateway node 102 and controller node 104 via communication links 108, 109. Access node 160 communicates with gateway node 102 and controller node 104 via communication links 106, 107. Access node 110, access node 160, and relay node 130 may communicate with each other, and other access nodes (not shown), using a wireless link or a wired link such as an X2 link. Components of exemplary access nodes 110, access node 160, and relay node 130 are further described with reference to FIGS. 2-4.

Wireless devices 120, 140, 141, 150, may be any device, system, combination of devices, or other such communication platform capable of communicating wirelessly with access node 110, access node 160, and/or relay node 130 using one or more frequency bands deployed therefrom. Each of wireless devices 120, 140, 141, 150, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 140, 141, 150. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106-109 can use various communication media, such as air, space, metal, optical fiber, or some other signal propagation path—including combinations thereof. Communication links 106-109 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106-109 may include Si communication links. Other wireless protocols can also be used. Communication links 106-109 can be a direct link or might include various equipment, intermediate components, systems, and networks. Communication links 106-109 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of relay node 130, resource requirements of end-user wireless devices 120, 140, 141, 150, and relay node 130, priority levels associated therewith, and so on. This information may be requested by or shared with access node 110 and/or access node 160 via communication links 106-109, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements (e.g. between access node 110 and communication network 101.)

In another exemplary embodiment, a processing node coupled to a network entity in system 100 can be configured to perform operations that include determining that wireless device 130 is within the coverage area 161 of a first type of wireless service provided by access node 160, where the first type of wireless service is not utilizing a multi-user multiple-input multiple-output (MU-MIMO) operating mode (e.g., 8T8R 4G service.) As a result of wireless device 130 being within the coverage area 161 of the first type of wireless service, wireless device 130 may attach to the first type of wireless service provided by access node 160. The operations also include determining that wireless device 130 is within the coverage area 111 of a second type of wireless service provided by access node 110, where the second type of wireless service is configured to utilize the MU-MIMO operating mode (e.g., 64+ transmit antenna and 64+ receive antenna 5G service.) As a result of wireless device 130 being within the coverage area 111 of the second type of wireless service, wireless device 130 may attach to the second type of wireless service provided by access node 110. The operations also include identifying wireless device 130 as being a relay node configured to attach to a first radio air interface (e.g., link 135 or link 136) and to deploy a second radio air interface (e.g., link 155) to which one or more end-user wireless devices 150 become attached. The operations also include, based on the identification of wireless device 130 as being a relay node, instructing wireless device 130 to attach to access node 160 to communicate using the first type of wireless service.

The operations may further include determining one or more of wireless devices 120 are also within the coverage area 161 of the first type of wireless service provided by access node 160. As a result of wireless devices 120 being within the coverage area 161 of the first type of wireless service, wireless devices 120 may attach to the first type of wireless service provided by access node 160. The operations may include determining one or more of wireless devices 120 are within coverage area 111 of the second type of wireless service provided by access node 110. As a result of wireless devices 120 being within the coverage area 111 of the second type of wireless service, wireless device 130 may attach to the second type of wireless service provided by access node 110. The operations may include identifying one or more of wireless devices 120 as being an end-user wireless device. The operations may include, based on the identification of one or more of wireless devices 120 as being an end-user wireless device, instructing one or more of wireless devices 120 to attach to access node 110 to communicate using the second type of wireless service. The operations may include instructing one or more of wireless devices 120 to start utilizing the MU-MIMO operating mode.

In another exemplary embodiment, a processing node coupled to a network entity in system 100 can be configured to receive a first indicator that wireless device 130 is configured as a relay node and is within a coverage area 161 of access node 160 and may therefore attach to, and communicate with, access node 160 using a first type of wireless service. The processing node receives a second indicator that wireless device 130 is also within a coverage area 111 of access node 110 and therefore may therefore attach to, and communicate with, access node 110 using a second type of wireless service. The second type of wireless service is configured to utilize a multi-user multiple-input multiple-output (MU-MIMO) operating mode. The processing node receives a third indicator that one or more wireless devices 120 are within coverage area 161 of access node 160 and therefore may therefore attach to, and communicate with, access node 160 using the first type of wireless service. The processing node receives a fourth indicator that the one or more wireless devices 120 are also within the second coverage area 111 of access node 110 and therefor may attach to, and communicate with, access node 110 using the second type of wireless service. The processing node identifies the one or more wireless devices 120 as being an end-user wireless devices 120 (as opposed to being configured as a relay node.) The processing node, based on the one or more wireless devices 120 being an end-user wireless device, instructs the one or more wireless devices 120 to attach to access node 110 in order to communicate using the second type of wireless service.

Figure 2:
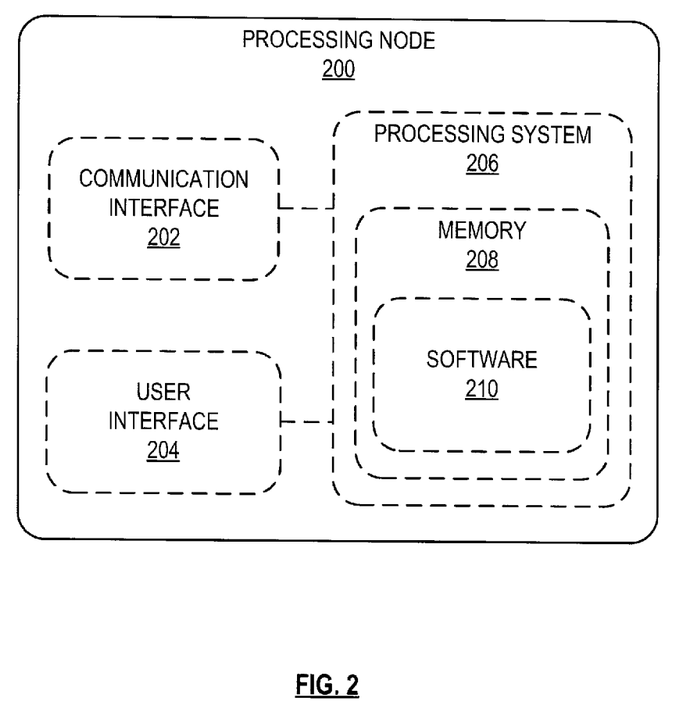
FIG. 2 illustrates an example processing node for instructing wireless devices and relay nodes in wireless networks.

FIG. 2 illustrates an example processing node for instructing wireless devices and relay nodes in wireless networks. In FIG. 2, processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a coherence determination module. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
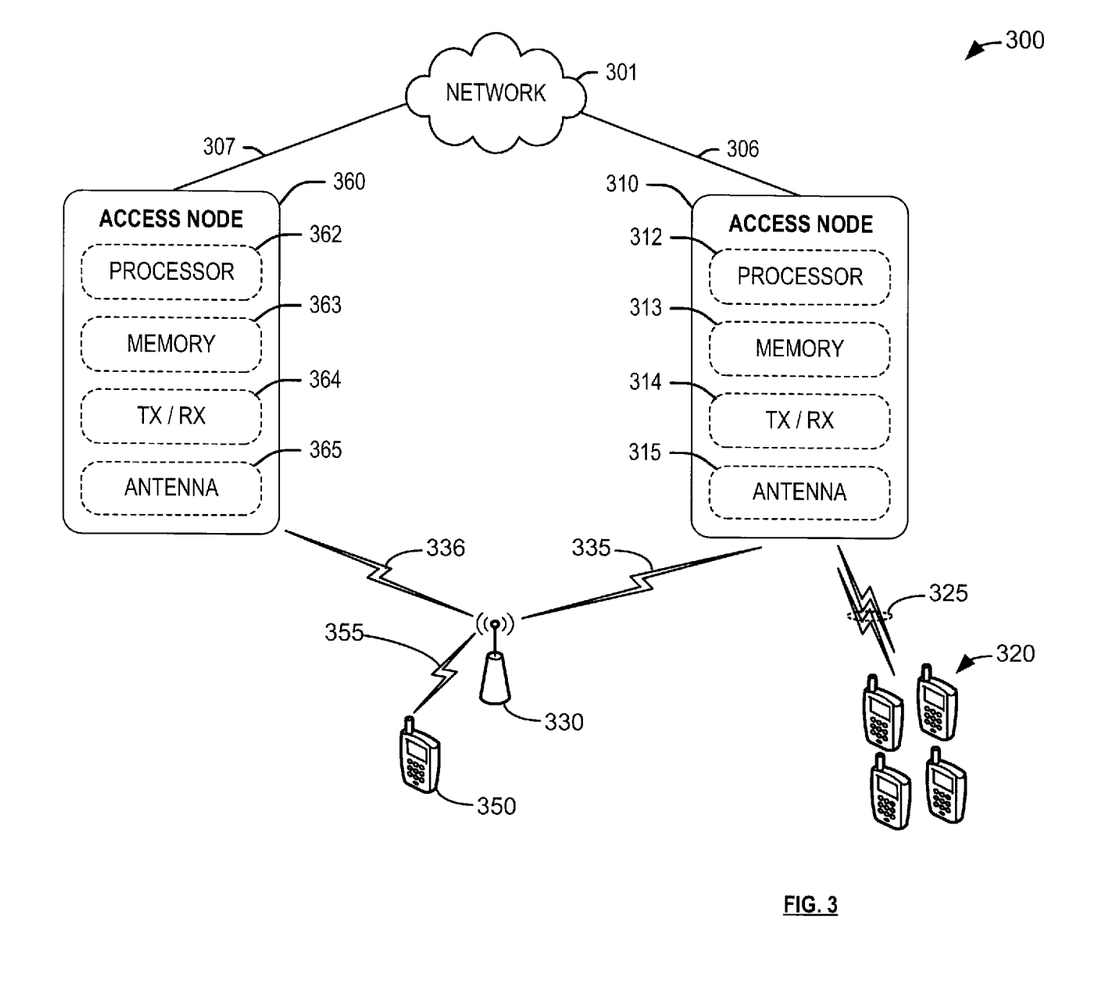
FIG. 3 illustrates an example communication system configured to utilize MU-MIMO and communicate with a relay node.

FIG. 3 illustrates an example communication system configured to utilize MU-MIMO and communicate with a relay node. Communication system 300 comprises network 301, access node 310, access node 360, end-user wireless devices 320 and 350, and relay node 330. Access node 310 may comprise, for example, a macro-cell access node, that is configured to utilize the MU-MIMO mode of operation, such as access node 110 described with reference to FIG. 1. Access node 360 may comprise, for example, a macro-cell access node, that is not configured to utilize the MU-MIMO mode of operation, such as access node 160 described with reference to FIG. 1.

Access node 310 is illustrated as comprising a processor 312, memory 313, transceiver 314, and antenna 315. Processor 312 executes instructions stored on memory 313, while transceiver 314 and antenna 315 enable wireless communication with wireless devices 320 and relay node 330. Instructions stored on memory 313 can include deploying a wireless air interface via combination of transceiver 314 and antenna 315, enabling wireless devices 320 and (optionally) relay node 330 to access network services from network 301 via access node 310. Access node 310 may be configured to communicate with end-user wireless device 350 via relay node 330. Thus, access node 310 may be referred to as a donor access node.

Access node 360 is illustrated as comprising a processor 362, memory 363, transceiver 364, and antenna 365. Processor 362 executes instructions stored on memory 363, while transceiver 364 and antenna 365 enable wireless communication with wireless devices 320 and relay node 330. Instructions stored on memory 313 can include deploying a wireless air interface via combination of transceiver 314 and antenna 315, enabling wireless devices 320 and (optionally) relay node 330 to access network services from network 301 via access node 360. Access node 360 may be configured to communicate with end-user wireless device 350 via relay node 330. Thus, access node 310 may be referred to as a donor access node.

Access node 310, access node 360, or another element of communication system 300, may be configured to identify relay node 330 as being connected thereto, determine a configuration thereof, and schedule resources towards backhauls 335 and 336 based thereon. For example, one or more elements of communication system 300 may receive a first indicator that relay node 330 is within the coverage area of access node 360 and may communicate with access node 360 using a first type of wireless service that is not configured to utilize MU-MIMO operating mode. One or more elements of communication system 300 may receive a second indicator that relay node 330 is within the coverage area of access node 310 and may communicate with access node 310 using a second type of wireless service that is configured to utilize a multi-user multiple-input multiple-output (MU-MIMO) operating mode. One or more elements of communication system 300 may identify relay node 330 as being configured to attach to a first radio air interface (e.g., link 335 or link 336) and to deploy a second radio air interface (e.g., link 355) to which one or more end-user wireless devices 350 become attached. One or more elements of communication system 300 may, based on relay node 330 being configured as a relay node, instruct relay node 330 to attach to access node 360 to communicate using the first type of wireless service.

One or more elements of communication system 300 may receive a third indicator that one or more of wireless devices 320 is within the first coverage area and is also within the second coverage area. The one or more of wireless devices 320 may be identified as an end-user wireless device. Based on the one or more of wireless devices 320 being end-user wireless devices, one or more of wireless devices 320 may be instructed to attach to access node 310 to communicate using the second type of wireless service. The one or more of wireless devices 320 may be further instructed to start utilizing the MU-MIMO operating mode. The first type of wireless service may be, for example, associated with Fourth Generation (4G) wireless broadband communication service. The second type of wireless service may be, for example, associated with Fifth Generation (5G) wireless broadband communication service.

In another exemplary embodiment, one or more elements of communication system 300 receive a first one or more indicators that wireless device 330 is configured as a relay node is within the coverage area of access node 360 and may therefore communicate using a first type of wireless service. The one or more elements of communication system 300 may also receive a second one or more second indicators that wireless device 330 is also within the coverage area for access node 310 and may therefore communicate using a second type of wireless service. The second type of wireless service being configured to utilize a multi-user multiple-input multiple-output (MU-MIMO) operating mode. The one or more elements of communication system 300 receiving a third one or more indicators that one or more wireless devices 320 are within the coverage area of access node 360 and receive a fourth one or more indicators that the one or more wireless devices 320 is also within the coverage area of access node 310. The one or more elements of communication system 300 identify the one or more wireless devices 320 as an end-user wireless device(s). Based on the second wireless device being an end-user wireless device, one or more elements of communication system 300 instruct the one or more wireless devices 320 to attach to access node 310 in order to communicate using the second type of wireless service.

One or more elements of communication system 300 may instruct the one or more wireless devices 320 to start utilizing the MU-MIMO operating mode. Wireless device 330 may be identified by one or more elements of communication system 300 as a relay node configured to attach a first radio air interface and to deploy a second radio air interface to which one or more end-user wireless devices become attached. One or more elements of communication system 300 may, based on wireless device 330 being configured as a relay node, instruct wireless device 330 to attach a first radio air interface to access node 360 to communicate using the first type of wireless service. One or more elements of communication system 300 may determine that a number of end-user wireless devices attached to wireless device 330 meets a first threshold number (e.g., 10, 20, etc. number of attached devices.) One or more elements of communication system 300 may, based on the number of end-user wireless devices meeting the first threshold number, increase a priority of resources allocated towards the wireless device 330. One or more elements of communication system 300 may, based on the number of end-user wireless devices meeting a second threshold number (e.g., zero attached devices), instruct wireless device 330 to attach the first radio air interface to access node 310 to communicate using the second type of wireless service.

In another exemplary embodiment, one or more elements of communication system 300 schedule resources to provide a first type of wireless service and to provide a second type of wireless service. One or more elements of communication system 300 perform operations that include determining wireless device 330 is within a first coverage area of the first type of wireless service, where the first type of wireless service is not utilizing a multi-user multiple-input multiple-output (MU-MIMO) operating mode. One or more elements of communication system 300 perform operations that include determining wireless device 330 is also within a second coverage area of the second type of wireless service, where the second type of wireless service is configured to utilize the MU-MIMO operating mode. One or more elements of communication system 300 perform operations that include identifying the wireless device 330 as being a relay node configured to attach to a first radio air interface and to deploy a second radio air interface to which one or more end-user wireless devices become attached. One or more elements of communication system 300 perform operations that include, based on the identification of wireless device 330 as being a relay node, instructing wireless device 330 to attach to the first type of wireless service.

One or more elements of communication system 300 perform operations that may include determining one or more of wireless devices 320 is within the first coverage area of the first type of wireless service. One or more elements of communication system 300 perform operations that may include determining the one or more of wireless devices 320 is within the second coverage area of the second type of wireless service. One or more elements of communication system 300 perform operations that may include identifying the one or more of wireless device(s) 320 as being an end-user wireless device. One or more elements of communication system 300 perform operations that may include, based on the identification of the one or more of wireless device(s) 320 as being an end-user wireless device, instructing the one or more of wireless device(s) 320 to attach to the second type of wireless service. One or more elements of communication system 300 perform operations that may include instructing the one or more of wireless device(s) 320 to start utilizing the MU-MIMO operating mode.

Figure 4:
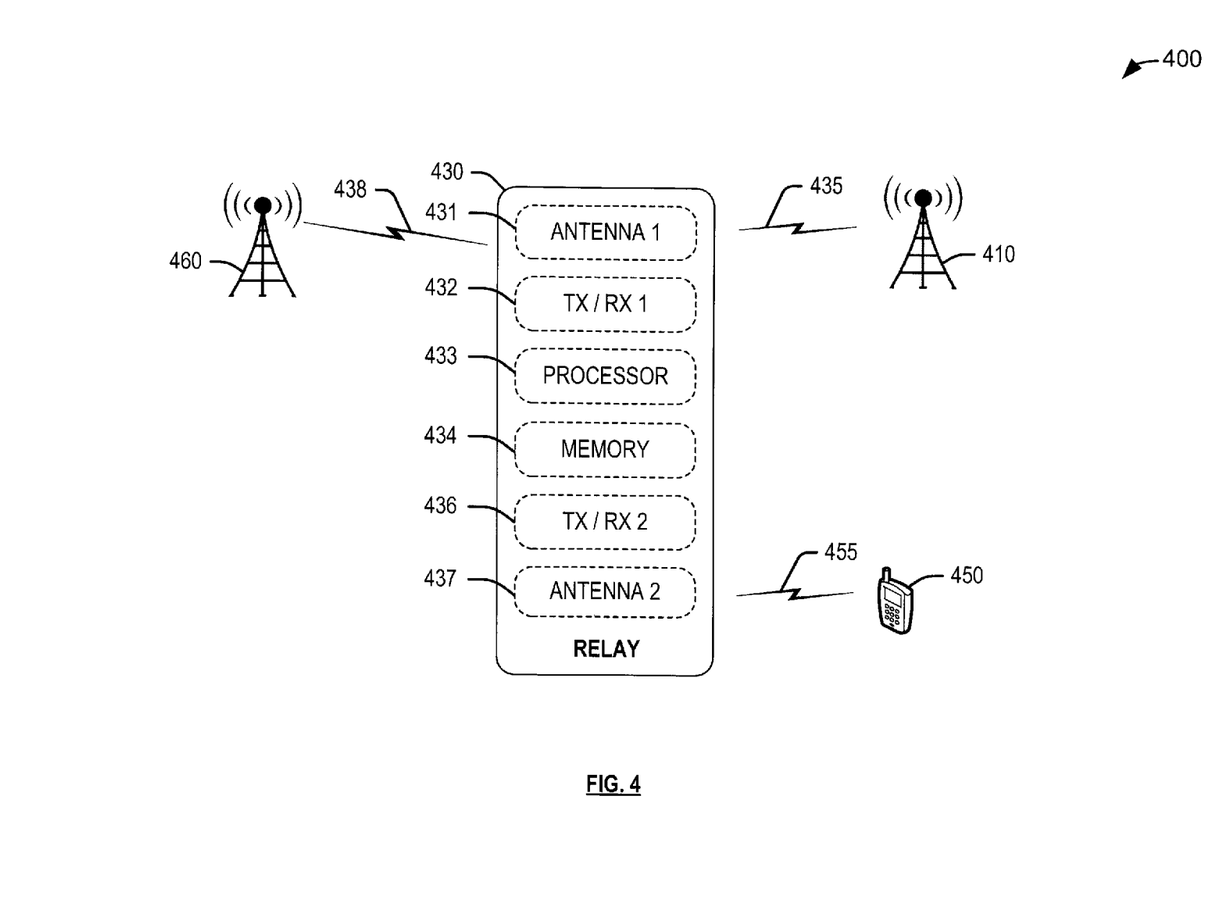
FIG. 4 illustrates an example relay node.

FIG. 4 illustrates an example relay node. In FIG. 4, relay node 430 comprises a first antenna 431, first transceiver 432, processor 433, memory 434, second transceiver 436, and a second antenna 437. Memory 434 may be used for storing instructions that are executed by processor 433. Transceiver 432 and antenna 431 may be used for direct (i.e. unrelayed) communication with donor access node 410 or donor access node 460 via wireless backhaul link 435 and 438, respectively. Relay node 430 includes transceiver 436 and antenna 437 for enabling communication with wireless device 450 via link 455 thereby enabling wireless device 450 to attach thereto. When relay node 430 is attached to access node 410 or access node 460, and wireless device 450 is attached to relay node 430, communication system 400 is formed.

Relay node 430 may be configured to identify itself as a relay node to access node 410 and/or access node 460. Relay node may be configured to receive instructions and resource allocations from access node 410 and/or access node 460. For example, access node 410 and/or access node 460 may configure relay node 430 to determine whether or not relay node 430 is to attach to access node 460 and therefore not utilize MU-MIMO on backhaul 438. Access node 410 and/or access node 460 may configure relay node 430 to determine whether or not relay node 430 is to attach to access node 410 and therefore may utilize MU-MIMO on backhaul 435. Access node 410 and/or access node 460 may configure relay node 430 as to whether or not backhaul 435 is allowed to use MU-MIMO. Relay node 430 may report or otherwise communicate to access node 410 and/or access node 460 the number of devices attached to relay node 430. Relay node 430 may report or otherwise communicate, to access node 410 and/or access node 460, one or more signal strength(s) and/or other quality of service indicators associated with the devices (e.g., wireless device 450) attached to relay node 430.

Figure 5:
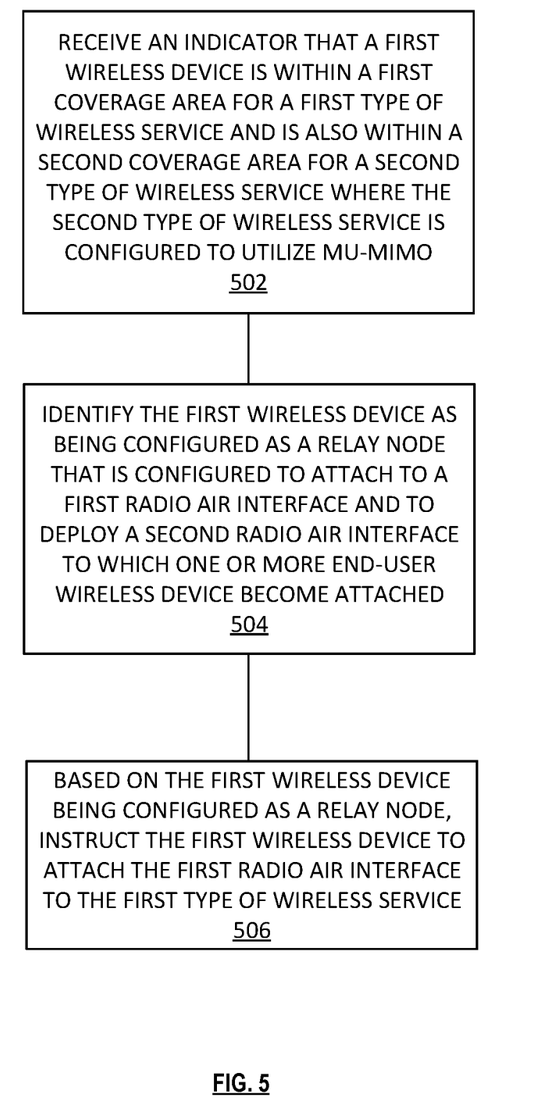
FIG. 5 is a flowchart illustrating a method for scheduling resources in a communication system.

FIG. 5 is a flowchart illustrating a method for scheduling resources in a communication system. The steps illustrated in FIG. 5 may be performed by one or more elements of system 100, processing node 200, system 300, system 400, and/or their components. An indicator that a first wireless device is within a first coverage area for a first type of wireless service and is also within a second coverage area for a second type of wireless service is received where the second type of wireless service is configured to utilize MU-MIMO (502). For example, access node 110, access node 160, and/or other elements of network 100 (e.g., control node 104) may receive an indicator that wireless device 330 is located within both coverage area 111 and coverage area 161.

The first wireless device is identified as being configured as a relay node that is configured to attach to a first radio air interface and to deploy a second radio air interface to which one or more end-user wireless device become attached (504). For example, access node 110, access node 160, and/or other elements of network 100 (e.g., control node 104) may receive an indicator that wireless device 130 is configured as a relay node. This indicator may be stored by one or more of access node 110, access node 160, and/or other elements of network 100 (e.g., control node 104). This indicator may sent by wireless device 130 to access node 110, access node 160, and/or other elements of network 100 (e.g., control node 104).

Based on the first wireless device being configured as a relay node, instruct the first wireless device to attach the first radio air interface to the first type of wireless service (506). For example, based on the identification of wireless device 130 as being a relay node, access node 110, access node 160, and/or other elements of network 100 (e.g., control node 104) may instruct wireless device 130 to attach to access node 160 and thereby communicate using the first type of wireless service (which is not configured to utilize MU-MIMO.)

Figure 6:
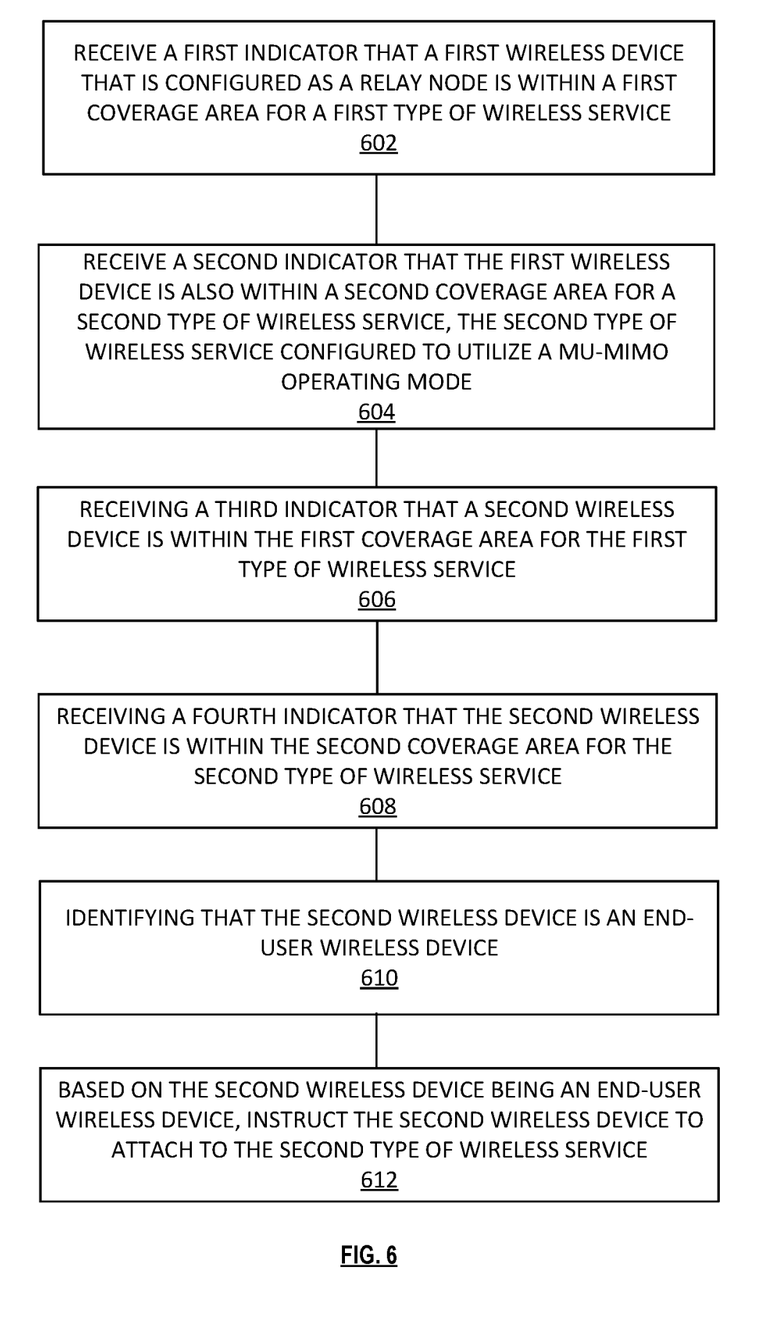
FIG. 6 is a flowchart illustrating a method for selecting an access node to service a wireless device.

FIG. 6 is a flowchart illustrating a method for selecting an access node to service a wireless device. The steps illustrated in FIG. 6 may be performed by one or more elements of system 100, processing node 200, system 300, system 400, and/or their components. A first indicator that a first wireless device that is configured as a relay node is within a first coverage area for a first type of wireless service is received (602). For example, control node 104 may receive, from access node 160 an indicator that wireless device 130 is within coverage area 161.

A second indicator that the first wireless device is also within a second coverage area for a second type of wireless service where the second type of wireless service configured to utilize a MU-MIMO operating mode (604). For example, control node 104 may receive, from access node 110 an indicator that wireless device 130 is within coverage area 111. Control node 104 may be configured with the information that access node 410 may utilize MU-MIMO.

A third indicator that a second wireless device is within the first coverage area for the first type of wireless service is received (606). For example, control node 104 may receive, from access node 160 an indicator that wireless device(s) 120 are within coverage are 161. A fourth indicator that the second wireless device is within the second coverage area for the second type of wireless service is received (608). For example, control node 104 may receive, from access node 110 an indicator that wireless device(s) 120 are within coverage are 111.

The second wireless device is identified as an end-user wireless device (610). For example, access node 110, access node 160, and/or other elements of network 100 (e.g., control node 104) may receive an indicator that wireless device(s) 120 is not configured as a relay node and/or is an end-user wireless device. This indicator may be stored by one or more of access node 110, access node 160, and/or other elements of network 100 (e.g., control node 104). This indicator may sent by wireless device(s) 120 to access node 110, access node 160, and/or other elements of network 100 (e.g., control node 104).

Based on the second wireless device being an end-user wireless device, the second wireless device is instructed to attach to the second type of wireless service (612). For example, based on the identification of wireless device(s) 120 as being an end-user wireless device, access node 110, access node 160, and/or other elements of network 100 (e.g., control node 104) may instruct wireless device(s) 120 to attach to access node 110 and thereby communicate using the first type of wireless service (which is configured to utilize MU-MIMO.)

Figure 7:
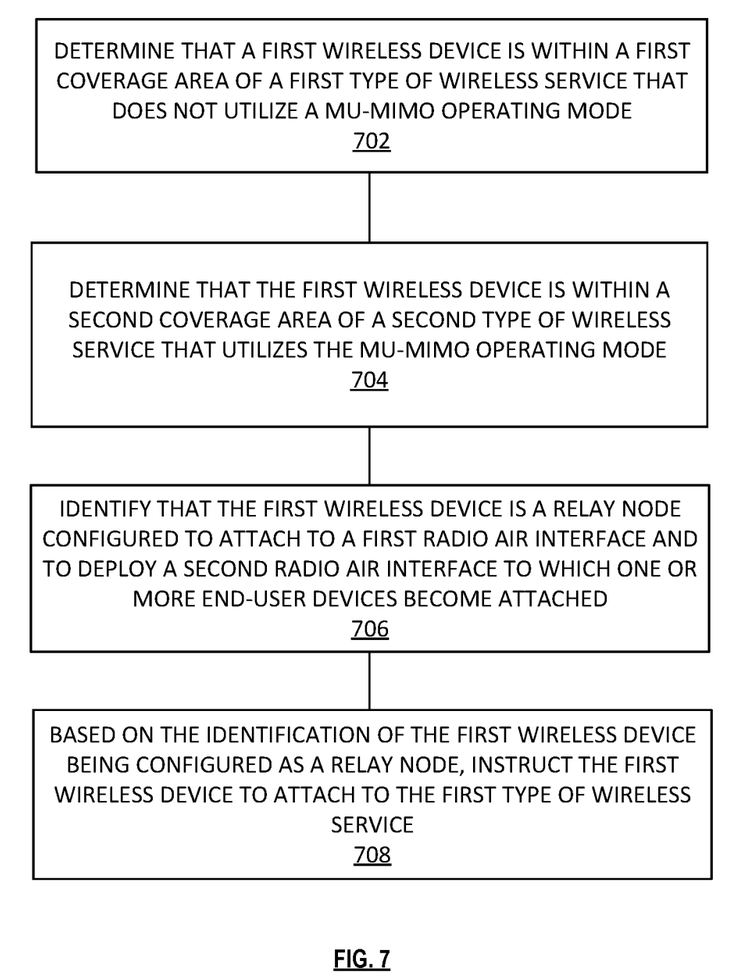
FIG. 7 is a flowchart illustrating a method of controlling a relay node.

FIG. 7 is a flowchart illustrating a method for selecting an access node to service a wireless device. The steps illustrated in FIG. 7 may be performed by one or more elements of system 100, processing node 200, system 300, system 400, and/or their components. A first wireless device is determined to be within a first coverage area of a first type of wireless service that does not utilize a MU-MIMO operating mode (702). For example, wireless device 130 and/or access node 160 (which does not utilize MU-MIMO) may determine that wireless device 130 is within coverage area 161 provided by access node 160 for the first type of wireless service (e.g., 8T8R 4G service.)

The first wireless device is determined to be within a second coverage area of a second type of wireless service that utilizes the MU-MIMO operating mode (704). For example, wireless device 130 and/or access node 110 (which is configured to utilize MU-MIMO) may determine that wireless device 130 is within coverage area 111 provided by access node 110 for the second type of wireless service (e.g., 64+ transmit and 64+ receive 5G service.)

The first wireless device is identified as a relay node configured to attach to a first radio air interface and to deploy a second radio air interface to which one or more end-user devices become attached (706). For example, access node 110, access node 160, and/or other elements of network 100 (e.g., control node 104) may receive an indicator that wireless device 130 is configured as a relay node. This indicator may be stored by one or more of access node 110, access node 160, and/or other elements of network 100 (e.g., control node 104). This indicator may sent by wireless device 130 to access node 110, access node 160, and/or other elements of network 100 (e.g., control node 104).

Based on the identification of the first wireless device being configured as a relay node, the first wireless device is instructed to attach to the first type of wireless service (708). For example, based on the identification of wireless device 130 as being a relay node, access node 110, access node 160, and/or other elements of network 100 (e.g., control node 104) may instruct wireless device 130 to attach to access node 160 and thereby communicate using the first type of wireless service (which is not configured to utilize MU-MIMO.)

Figure 8:
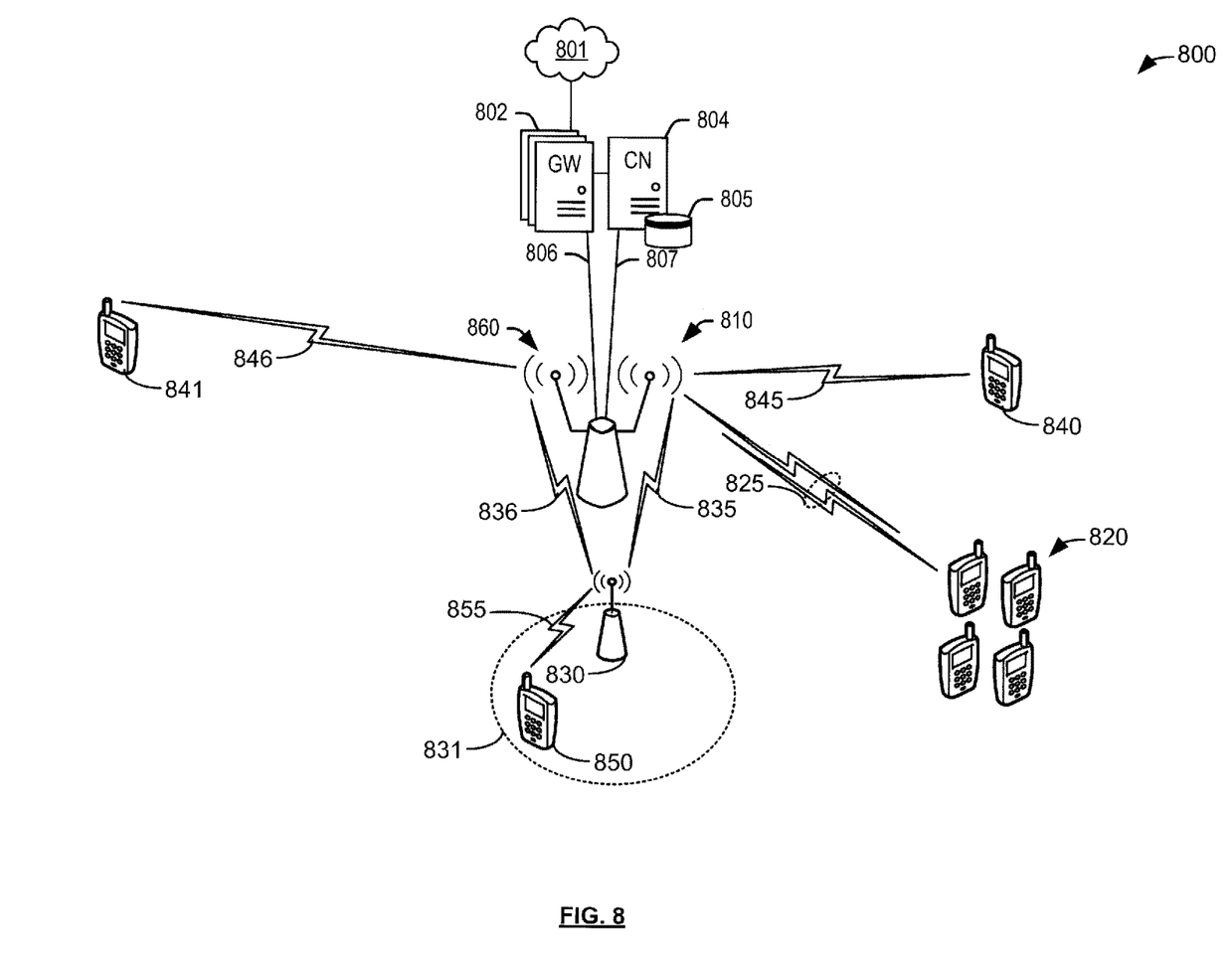
FIG. 8 is a block diagram illustrating a co-located communication system.

FIG. 8 is a block diagram illustrating a co-located communication system. System 800 comprises a communication network 801, gateway node(s) 802, controller node 804, access node 810, access node 860, relay node 830, wireless devices 820, 840, 841, and 850. Access node 860 illustrated as deploying a wireless air interface (e.g., links 836 and 846) for a first type of wireless service. Access node 810 is illustrated as deploying a wireless air interface for a second type of wireless service (e.g., links 825, 835 and 845). In an embodiment, access node 860 and access node 810 may be collocated.

Relay node 830 and wireless devices 820, 840, and 850 are configured and positioned such that wireless devices 820, 840, and/or 850 may access network services via access node 810. Relay node 830 and wireless device 841 are configured and positioned such that relay node 830 and wireless device 841 may access network services via access node 860.

Relay node 830 may be configured to communicate with access node 810 over communication link 835, (hereinafter, "wireless backhaul" or simply "backhaul").

Relay node 830 may be configured to communicate with access node 860 over communication link 836. Relay node 830 is further configured to deploy additional wireless air interfaces over coverage areas 831. Wireless device 850 is configured to attach to the wireless air interface of relay node 830. Wireless device 850 may access network services from access node 810 (via link 835) or access node 860 (via link 835) by virtue of being connected to relay node 830. Consequently, access nodes 810 and 860 may be termed a "donor" access nodes. In other embodiments, any other combination of wireless devices, donor access nodes, relay access nodes, and carriers deployed therefrom may be evident to those having ordinary skill in the art in light of this disclosure.

In operation, control node 804 (or another entity within system 800) may be configured to execute a method of operating a communication system that includes receiving an indicator that a first wireless device (e.g., relay node 830) may attach to a first type of wireless service (e.g., 4G as provided by access node 860) and also may attach to a second type of wireless service (e.g., 5G as provided by access node 810). The second type of wireless service (e.g., provided by access node 810) is configured to utilize a multi-user multiple-input multiple-output (MU-MIMO) operating mode. The method further includes identifying the first wireless device as being configured as a relay node that is to attach to a first radio air interface and to deploy a second radio air interface to which one or more end-user wireless devices (e.g., wireless device 850) become attached. The method further includes, based on the first wireless device being configured as a relay node, instructing the first wireless to attach the first radio air interface to the first type of wireless service.

Alternatively or in addition, a second indicator that a second wireless device (e.g., one or more of wireless devices 820) may attach to the first type of wireless service (e.g., as provided by access node 860) and may also attach to the second type of wireless service may be received. The second wireless device may be identified as an end-user wireless device. Based on the second wireless device being an end-user wireless device, the second wireless device may be instructed to attach to the second type of wireless service. The second wireless device may be further instructed to start utilizing the MU-MIMO operating mode. The first type of wireless service may be, for example, associated with Fourth Generation (4G) wireless broadband communication service. The second type of wireless service may be, for example, associated with Fifth Generation (5G) wireless broadband communication service.

In addition, it may be determined (e.g., by control node 804 or access node 860, etc.) that the number of end-user wireless devices attached to relay node 830 meets a first threshold number (e.g., 80 devices, 20 devices, etc.). Based on the number of end-user wireless devices meeting the first threshold number, a priority of resources allocated towards the first wireless device may be increased.

The resources described herein may be, for example, physical resource blocks (PRBs) within one or more subframes of a radio-air interface deployed by an access node. For example, a subframe can comprise a plurality of PRBs allocated for control information (e.g. within a control channel) and for data transmission (e.g. within a data channel).

Based on the number of end-user wireless devices meeting a second threshold number (e.g., zero attached devices), the first wireless device may be instructed to attach the first radio air interface to the second type of wireless service.

Once attached to the second type of wireless service, the first wireless device may be instructed to utilize the MU-MIMO operating mode.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving an indicator that a first wireless device may attach to a first type of wireless service and also may attach to a second type of wireless service, the second type of wireless service being configured to utilize a multi-user multiple-input multiple-output (MU-MIMO) operating mode;
    identifying the first wireless device as being configured as a relay node that is configured to attach to a first radio air interface and to deploy a second radio air interface to which one or more end-user wireless devices become attached;
    based on the first wireless device being configured as a relay node, instructing the first wireless to attach the first radio air interface to the first type of wireless service;
    receiving a second indicator that a second wireless device may attach to the first type of wireless service and also may attach to the second type of wireless service;
    identifying the second wireless device as an end-user wireless device;
    based on the second wireless device being an end-user wireless device, instructing the second wireless to attach to the second type of wireless service;
    determining that a number of end-user wireless devices attached to the first wireless device meets a first threshold number; and
    based on the number of end-user wireless devices meeting the first threshold number, increasing a priority of resources allocated towards the first wireless device.

2. The method of claim 1, further comprising:
    instructing the second wireless device to start utilizing the MU-MIMO operating mode.

3. The method of claim 1, wherein the first type of wireless service is associated with Fourth Generation (4G) wireless broadband communication service.

4. The method of claim 3, wherein the second type of wireless service is associated with Fifth Generation (5G) wireless broadband communication service.

5. The method of claim 1, further comprising:
    deploying the first type of wireless service from a first access node; and
    deploying the second type of wireless service from a second access node.

6. The method of claim 5, wherein the first and second access nodes are co-located.

7. The method of claim 1, wherein the resources comprise physical resource blocks (PRBs).

8. A system for allocating resources in a wireless network, comprising:
    a processing node; and
    a processor coupled to the processing node, the processor configured to perform operations comprising:
        receiving a first indicator that a first wireless device that is configured as a relay node is within a first coverage area for a first type of wireless service;
        receiving a second indicator that the first wireless device is also within a second coverage area for a second type of wireless service, the second type of wireless service configured to utilize a multi-user multiple-input multiple-output (MU-MIMO) operating mode;
        receiving a third indicator that a second wireless device is within the first coverage area for the first type of wireless service and receiving a fourth indicator that the second wireless device is also within the second coverage area for the second type of wireless service;
        identifying the second wireless device as an end-user wireless device;
        based on the second wireless device being an end-user wireless device, instructing the second wireless device to attach to the second type of wireless service;
        determining whether a number of end-user wireless devices attached to the first wireless device meets a first or second threshold number;
        based on the number of end-user wireless devices meeting the first threshold number, instructing the first wireless device to attach to the first type of wireless service;
        based on the number of end-user wireless devices meeting the second threshold number, instructing the first wireless device to attach to the second type of wireless service; and
        based on the number of end-user wireless devices meeting the first threshold number, increasing a priority of resources allocated towards the first wireless device.

9. The system of claim 8, wherein the processor is further configured to perform operations comprising instructing the second wireless device to start utilizing the MU-MIMO operating mode.

10. The system of claim 8, wherein:
the first type of wireless service is associated with Fourth Generation (4G) wireless broadband communication service; and
the second type of wireless service is associated with Fifth Generation (5G) wireless broadband communication service.

11. The system of claim 8, wherein the processor is further configured to perform operations comprising:
deploying the first type of wireless service from a first access node; and
deploying the second type of wireless service from a second access node.

12. The system of claim 11, wherein the first and second access nodes are co-located.

13. The system of claim 8, wherein the first threshold number is greater than the second threshold number.

14. The system of claim 8, wherein the second threshold number is zero.

15. The system of claim 8, wherein the resources comprise physical resource blocks (PRBs).

16. A processing node for scheduling resources in a wireless network configured to provide a first type of wireless service and to provide a second type of wireless service, the processing node being configured to perform operations comprising:
determining a first wireless device is within a first coverage area of the first type of wireless service, the first type of wireless service not utilizing a multi-user multiple-input multiple-output (MU-MIMO) operating mode;
determining the first wireless device is within a second coverage area of the second type of wireless service, the second type of wireless service configured to utilize the MU-MIMO operating mode;
identifying the first wireless device as being a relay node configured to attach to a first radio air interface and to deploy a second radio air interface to which one or more end-user wireless devices become attached; and,
based on the identification of the first wireless device as being a relay node, instructing the first wireless device to attach to the first type of wireless service;
determining a second wireless device is within the first coverage area of the first type of wireless service;
determining the second wireless device is within the second coverage area of the second type of wireless service;
identifying the second wireless device as being an end-user wireless device;
based on the identification of the second wireless device as being an end-user wireless device, instructing the second wireless device to attach to the second type of wireless service;
determining that a number of end-user wireless devices attached to the first wireless device meets a first threshold number; and
based on the number of end-user wireless devices meeting the first threshold number, increasing a priority of resources allocated towards the first wireless device.

17. The processing node of claim 16, wherein the operations further comprise instructing the second wireless device to start utilizing the MU-MIMO operating mode.

18. The processing node of claim 16, wherein:
the first type of wireless service is associated with Fourth Generation (4G) wireless broadband communication service; and
the second type of wireless service is associated with Fifth Generation (5G) wireless broadband communication service.

19. The processing node of claim 16, wherein the operation further comprise:
deploying the first type of wireless service from a first access node; and
deploying the second type of wireless service from a second access node.

20. The processing node of claim 19, wherein the first and second access nodes are co-located.

\* \* \* \* \*